(No Model.) 2 Sheets—Sheet 1.
H. O. BROOKS.
ODOMETER.
No. 365,043. Patented June 21, 1887.
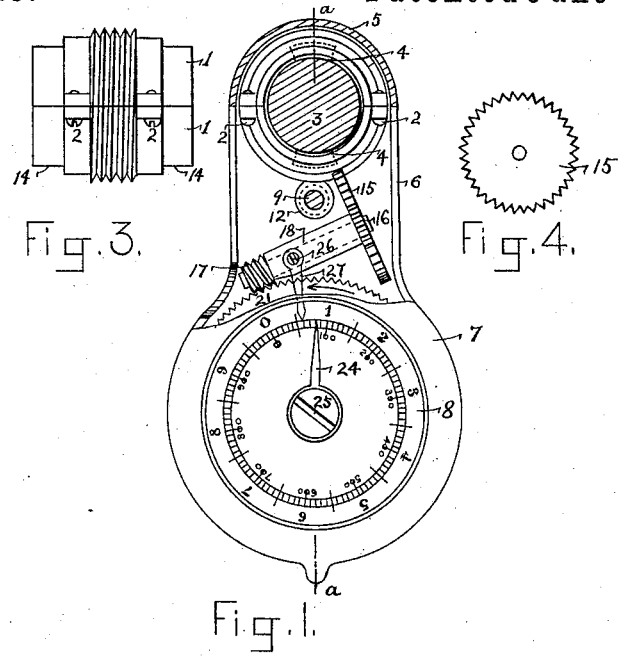
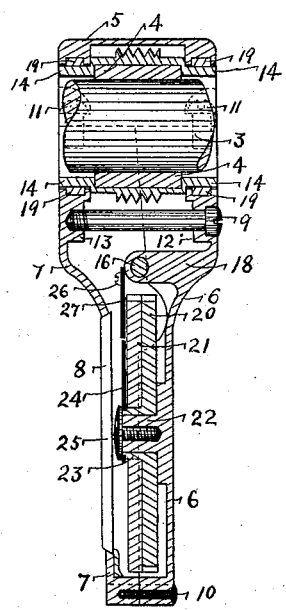
Witnesses:
Channing Whitaker.
Fred A. Lovejoy.
Inventor:
Henry Orville Brooks.

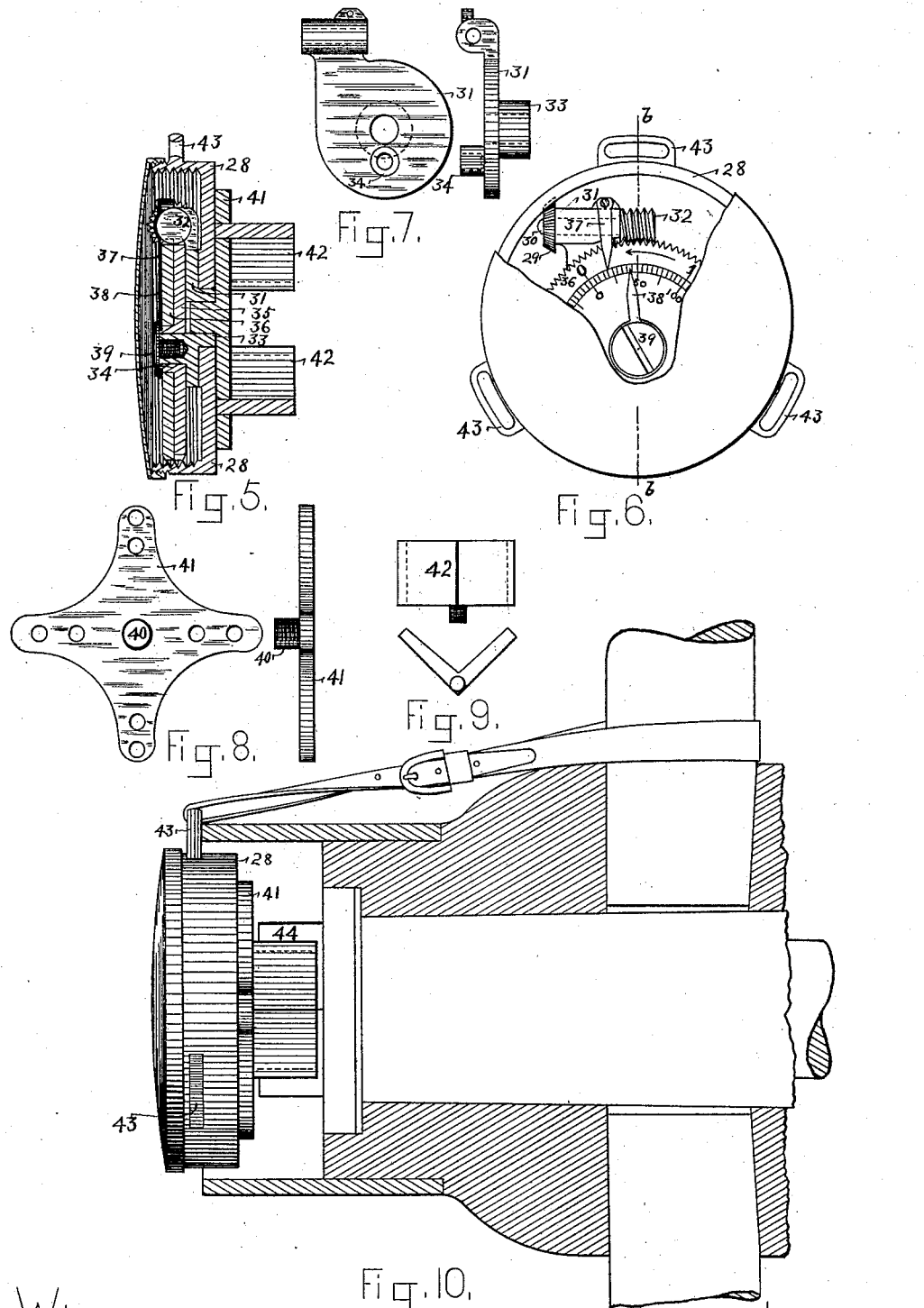

UNITED STATES PATENT OFFICE.

HENRY ORVILLE BROOKS, OF LOWELL, MASSACHUSETTS.

ODOMETER.

SPECIFICATION forming part of Letters Patent No. 365,043, dated June 21, 1887.

Application filed August 2, 1886. Serial No. 209,806. (No model.)

*To all whom it may concern:*

Be it known that I, HENRY ORVILLE BROOKS, a citizen of the United States, residing at Lowell, in the county of Middlesex and State of Massachusetts, have invented a new and useful Improvement in Odometers, of which the following is a specification.

My invention relates to that class of odometers which are intended to be detachably connected to a wheel of a known circumference which rolls over the ground; and it consists of certain mechanism which revolves with the said wheel and engages with other indicating mechanism which is by suitable means prevented from revolving with the said wheel. Odometers of this class are usually provided with a dial or dials, which either indicate the number of revolutions made by the said rolling wheel or the number of miles passed over by the wheel during its use.

The object of my invention is to provide a simple and inexpensive instrument which may be applied to any ordinary carriage, car, bicycle, or other suitable rolling wheel, which will accurately indicate the number of revolutions made by the said wheel or the number of miles passed over by it, as desired. This indication is made positively, and its accuracy is not affected by any usual jarring, however violent, to which the wheel may be subjected.

My invention is illustrated in the accompanying drawings, in which—

Figure 1 is an elevation of an odometer, such as I prefer to use upon bicycles, a part of the casing being broken away in order that its interior construction may be seen. Fig. 2 is an elevation, partly in section, at the line *a a* of Fig. 1 of the said odometer. Fig. 3 is an elevation of the primary screw which I use, and which is fastened to the axle of the bicycle. Fig. 4 is an elevation of the worm-wheel, which is supported by the main shaft within the odometer-casing and engages with the said primary screw. Fig. 5 is a central vertical section taken at the line *b b* of Fig. 6 of the improved odometer as modified for use in connection with an ordinary carriage-wheel. Fig. 6 is an elevation of the said modified form, a part of the casing-cap being broken away in order that most of the interior mechanism thereof may be readily seen. Fig. 7 is a front and side elevation of the main shaft-supporting standard. Fig. 8 is a front and side elevation of the clutch-support. Fig. 9 is an elevation and a view looking upward upon the under side of one of the clutch-pieces; and Fig. 10 is a partial elevation, partly in section, of an ordinary carriage-wheel hub, showing the manner in which I prefer to use the instrument with such wheels.

Similar reference-numbers refer to the same parts in the drawings.

In that form of odometer which is to be used upon bicycles and similar wheels I make use of a split clamp, 1, having upon its surface the screw, and provided with clamping-screws 2, by which it is clamped to the axle 3 of the bicycle-wheel. I prefer to provide both halves of the said split clamp with elastic cushions 4, made of rubber or other suitable material, and firmly attached thereto by being cemented into recesses therein, as shown in Figs. 1 and 2, or otherwise secured thereto. Although I am not obliged to use the said elastic cushions, I usually introduce them in order that the clamp 1 may the more readily fit axles of different machines, which might slightly vary in diameter, and that annoying rattling of the mechanism may be prevented.

Although other and equivalent means of suspending this form of odometer-casing may be adopted, I prefer to make the said casing, which is shown as made up of the top cap, 5, the back 6, and the front 7, that is provided with the glass watch-crystal 8, through which the dial may be observed, fit upon the cylindrical ends 14 of the split clamp 1. These various parts are secured together by screws 9, 10, and 11, the main strain being taken by the large screw 9, which passes through the lug 12 into the lug 13 upon the thin casing. The top cap, 5, the back 6, and the front 7 are preferably provided with shoulders, which, when the parts are fastened together by the screws 9, 10, and 11, may be bored out and fashioned so that the complete casing will fit with sufficient accuracy upon the cylindrical ends 14 of the clamp 1.

I frequently line the bearing of the casing upon the ends 14 of the screw 1 with strips 19, of leather or rubber or other suitable material, which strips project slightly from the faces of the said bearings, and prevent any rattling of the mechanism when it is in use, although this construction is not absolutely necessary.

The worm-wheel 15, which is secured upon the main shaft 16, engages with the threads of the screw 1, and is slowly turned thereby when the instrument is in operation. To the main shaft 16, which is supported by the lug 18, or other suitable means fastened to the casing, is secured the small worm 17, which when revolved drives the differential wheels 20 and 21. I prefer to make the wheel 20 to turn upon a boss, 22, that is fastened to the back of the casing, and the wheel 21 to turn upon the central boss, 23, of the wheel 20. The boss 23 also supports the main hand 24, which is secured thereto by the screw 25, that screws into the boss 22, as shown.

The wheel 20 is preferably provided with one hundred teeth, and the wheel 21 with ninety-nine teeth, although these numbers may be varied in any convenient manner, so long as the two wheels do not each have the same number of teeth, and the graduations of the dial are made to correspond. By means of the screw 26, or other suitable means, the hand 27 is fastened to the casing or to something affixed thereto.

When this instrument is attached to a bicycle-axle, the casing and the attached indicating mechanism are prevented from revolving by the effect of the weight of the suspended parts, the screw 1 turning within the casing simply, the friction between the said screw and the casing not being sufficient to overcome the tendency of the center of gravity of the casing and indicating mechanism to remain in the lowest possible position.

The odometer is to be attached to the bicycle-axle in such a way that the differential wheels are revolved in the direction shown by the arrow in Fig. 1 when the bicycle is driven forward. In that case the wheel 15 will be moved one tooth for each revolution of the bicycle, and the wheels 20 and 21 will be moved one tooth each for each revolution of the wheel 15. I prefer to affix to the wheel 21 a dial, which has as many divisions upon it as there are teeth in the wheel 20, in which case the hand 24 will apparently move to the right over the dial one point for each revolution of the wheel 20. I prefer to affix two sets of numbers to this dial, as shown in the drawings, and I read the outer set of numbers in connection with the hand 27, and the inner set in connection with the hand 24.

I find that it is easy to so fix the number of teeth in the wheel 15 that when attached to any one of the ordinary sizes of bicycles the outer row of figures, in connection with the scale upon the dial on the wheel 21, will indicate the miles and the inner row the hundreds of miles passed over by the bicycle, and that each point of the scale upon the dial will indicate one-tenth of a mile, if read with the hand 27, and ten miles if read with the hand 24. It is thus easy to read the distance passed over by the bicycle with great ease and accuracy.

The modified form of odometer shown in Figs. 5 and 6 is almost exactly like that shown in Fig. 1, the main differences being in the manner of attaching the instrument to the wheel, in the means of preventing the indicating mechanism as a whole from revolving with the wheel, and in the shape of the primary screw and the means of causing it to revolve with the wheel. These differences are differences in form only from those already described. With this modified form of odometer the primary screw is cut in the interior of the cylindrical part of the case 28, the worm-wheel 29 engaging therewith, and being supported upon the main shaft 30. The main shaft 30 is supported in the standard 31, and, like the main shaft in Fig. 1, is provided with a worm, 32, which is fixed thereto. The standard 31 is provided with a boss, 33, upon one side, which fits within a central hole in the back of the case 28, and upon the other side with a boss, 34, which supports a pair of differential wheels, 35 and 36, similar to those shown in Fig. 1. These wheels are similarly provided with teeth, and, like the wheels 20 and 21, the number of teeth in one wheel is different from the number of teeth in the other wheel. The stand 31 has attached to it a hand, 37, and the wheel 35 carries another hand, 38, attached to the said wheel by the screw 39, or other equivalent means. The indicating mechanism is thus seen to be entirely similar to that shown in Figs. 1 and 2. The boss 33 is provided with a central hole, within which the boss 40 of the clutch-support 41 may be screwed or otherwise fastened. The said clutch-support carries one or more clutching-pieces, 42, and it is provided with a series of holes at different distances from its center, within which the said clutching-pieces may be screwed or otherwise fastened in the proper manner to engage with different-sized axle-nuts. I do not limit myself to the use of this special clutching device, since I am aware that other devices may be equivalently substituted therefor.

The case 28 is preferably provided with the lugs 43, having slots through which straps may be passed, whereby the said case may be strapped to the spokes of the wheel with which the instrument is used, as shown in Fig. 10. These straps, which I prefer to make of some elastic material like a strong rubber strap, cause the case 28 and the primary screw cut therein to revolve with the wheel, while the clutch-pieces embrace the nut 44, which retains the wheel-hub upon its axle, as shown in Fig. 10, and thereby prevent the standard 31 and its attachments from revolving with the wheel. Any equivalent method of fixing the primary screw and the case to the wheel may be adopted when it is desirable to do so.

In the odometer shown in Fig. 6 the worm-wheel 29 is provided with a much less number of teeth than are upon the worm-wheel 15, which construction causes the points upon the dial in this case to correspond to five miles, if read in connection with the hand 38, and to one-twentieth of a mile, if read in connection with the hand 37. The number of teeth upon the differential wheels, and upon the worm-wheel which engages with the primary screw, may be varied in any convenient and desirable manner, as can also the arrangement of figures and their value upon the dial. It should be especially noted that the dial may be so arranged as to indicate the number of revolutions made by the wheel to which it is attached, in which case an engineer may carefully measure the exact circumference of his wheel, and by calculation get a result very closely agreeing with actual tape or chain measurements of the distance passed over by the wheel. The result thus obtained would ordinarily be correct enough for map-making and similar purposes.

While this instrument is primarily intended for an odometer, I sometimes apply a suitable form of the instrument to other revolving bodies in order to determine their rates of revolution or the total revolutions made thereby in a given time.

It should be observed that when this instrument is to be used upon a wheel where it is not necessary to split the primary screw, as shown in Fig. 3, in order to apply and remove the instrument, it will be better not to split the said screw, but to make it in a single piece and secure it to the axle in any other usual manner.

It is manifest that the wheel 20 and its hand may be sometimes dispensed with and the wheel 21 be used with its hand alone; also, that the hand 27 may be sometimes dispensed with when it is not necessary to read the results with great accuracy.

In my claims I speak of the primary screw revolving with the wheel to which the odometer is attached, while the indicating mechanism is kept from revolving by suitable means; but I consider that when the said primary screw is held from revolving and the indicating mechanism revolves with the wheel the action is exactly equivalent to that of the arrangement of the invention that is described in the claims.

What I claim as new, and desire to secure by Letters Patent, is—

1. The odometer consisting of the primary screw and means of attaching it to a wheel, the indicating mechanism made up of the differential wheels and a means of supporting the same, the dial with its scale, the hands, the main shaft provided with a worm engaging with the said differential wheels, and a wheel engaging with the primary screw, and a means of supporting the said shaft, together with a means of preventing the revolution of the said indicating mechanism as a whole, substantially as set forth, and for the purposes specified.

2. The odometer consisting of the primary screw and means of attaching it to a wheel, the indicating mechanism made up of the dial-wheel and the hand fixed to the case, the main shaft provided with the worm and engaging with the dial-wheel, and a wheel engaging with the primary screw, a means of supporting the said shaft, and a means of preventing the revolution of the indicating mechanism as a whole, substantially as described.

3. The odometer consisting of the primary screw and a means of attaching it to a wheel, the indicating mechanism made up of the differential wheels, with the hand attached to one of the said wheels and a dial attached to the other of the said wheels, the main shaft provided with the worm engaging with the said differential wheels and the wheel engaging with the primary screw, and a means of preventing the indicating mechanism as a whole from revolving, substantially as described, and for the purposes set forth.

HENRY ORVILLE BROOKS.

Witnesses:
CHANNING WHITAKER,
FRED. A. LOVEJOY.